April 23, 1957　　　G. A. BRONSON　　　2,789,470
PROJECTILE FEED DEVICE
Filed Aug. 5, 1952　　　　　　　　　　　　　6 Sheets-Sheet 1

INVENTOR.
GEORGE A. BRONSON
BY Edwin Coates
-ATTORNEY-

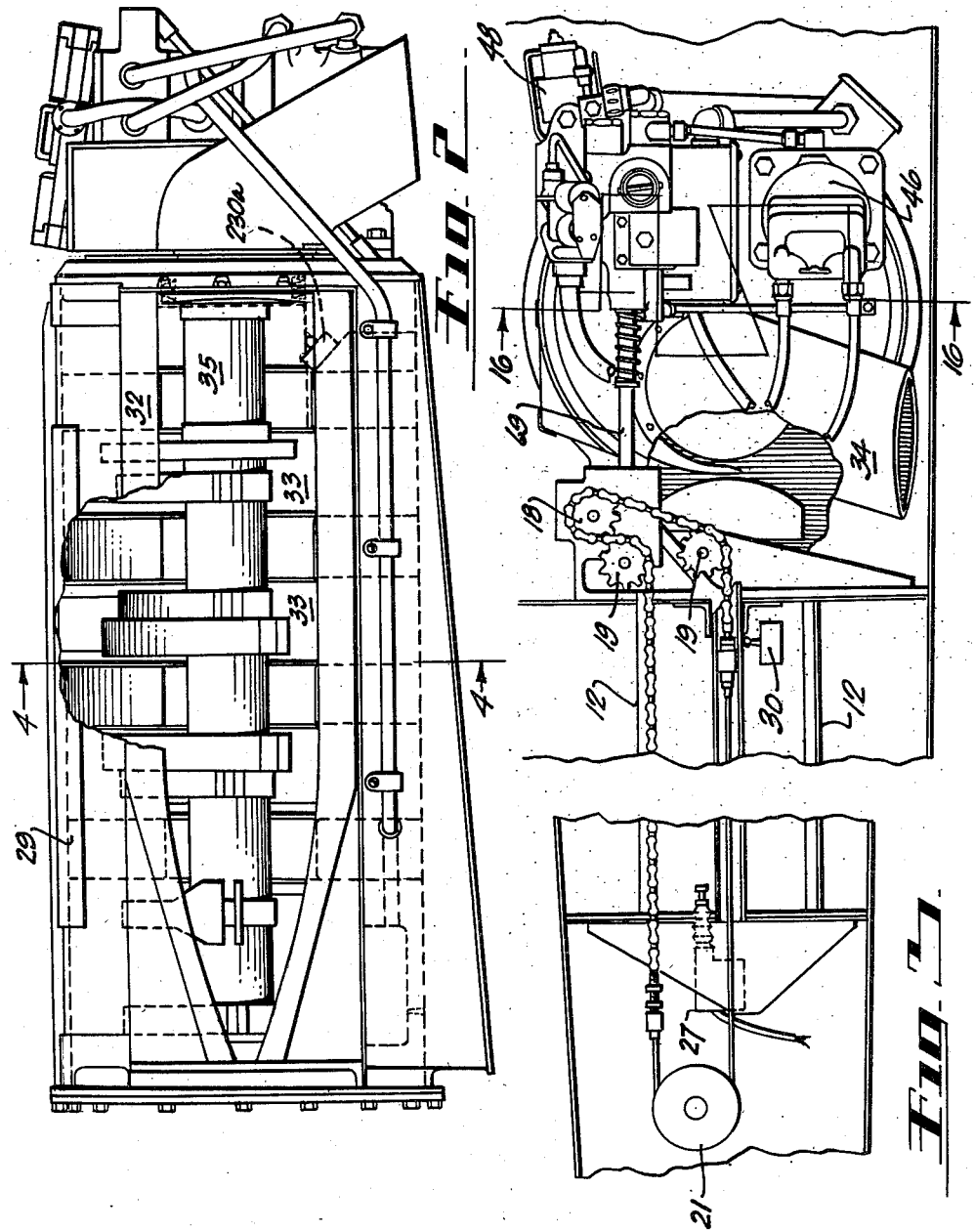

April 23, 1957 G. A. BRONSON 2,789,470
PROJECTILE FEED DEVICE
Filed Aug. 5, 1952 6 Sheets-Sheet 3
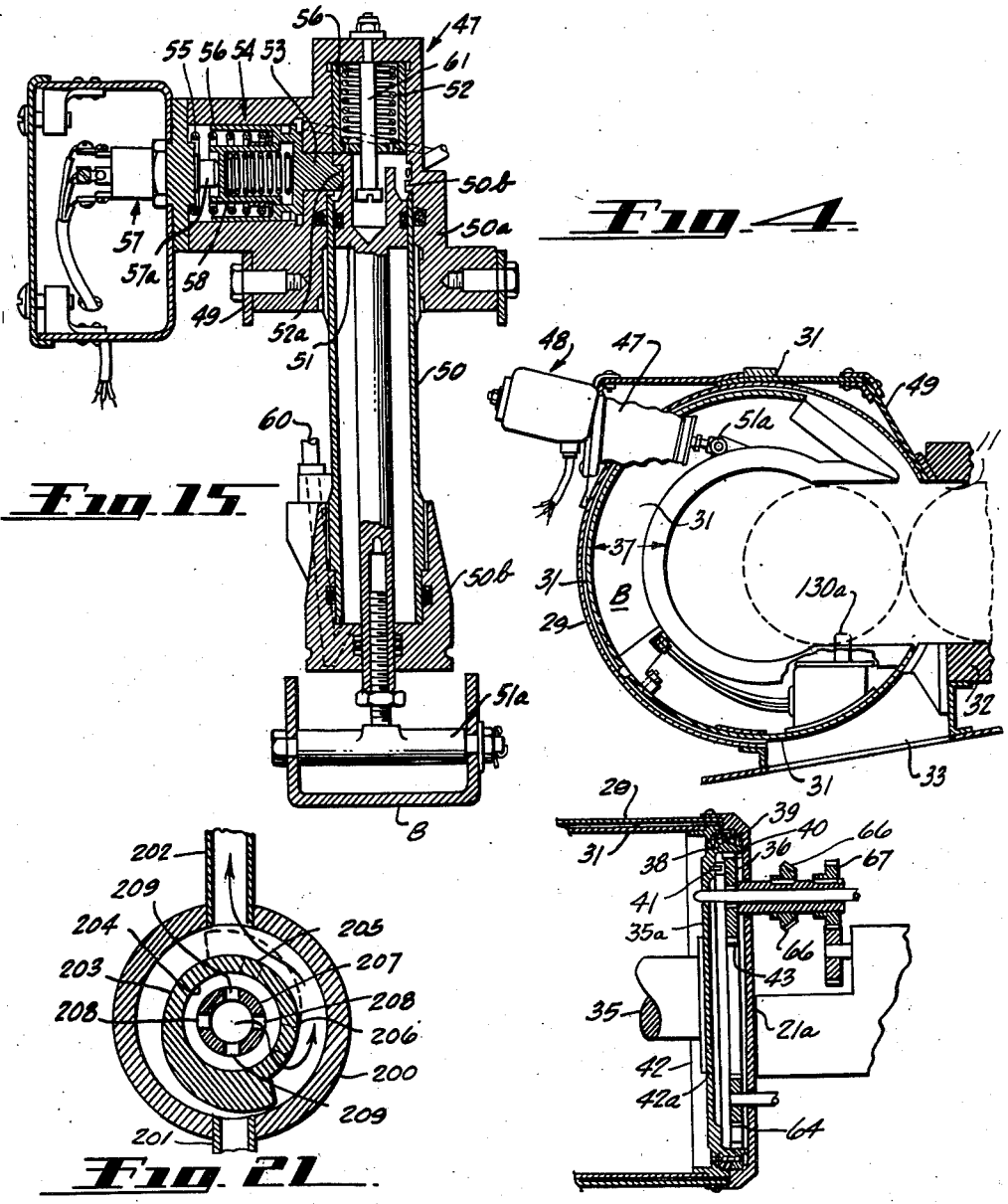
INVENTOR.
GEORGE A. BRONSON
BY
J. Edwin Coates
-ATTORNEY- April 23, 1957 G. A. BRONSON 2,789,470
PROJECTILE FEED DEVICE
Filed Aug. 5, 1952 6 Sheets-Sheet 4
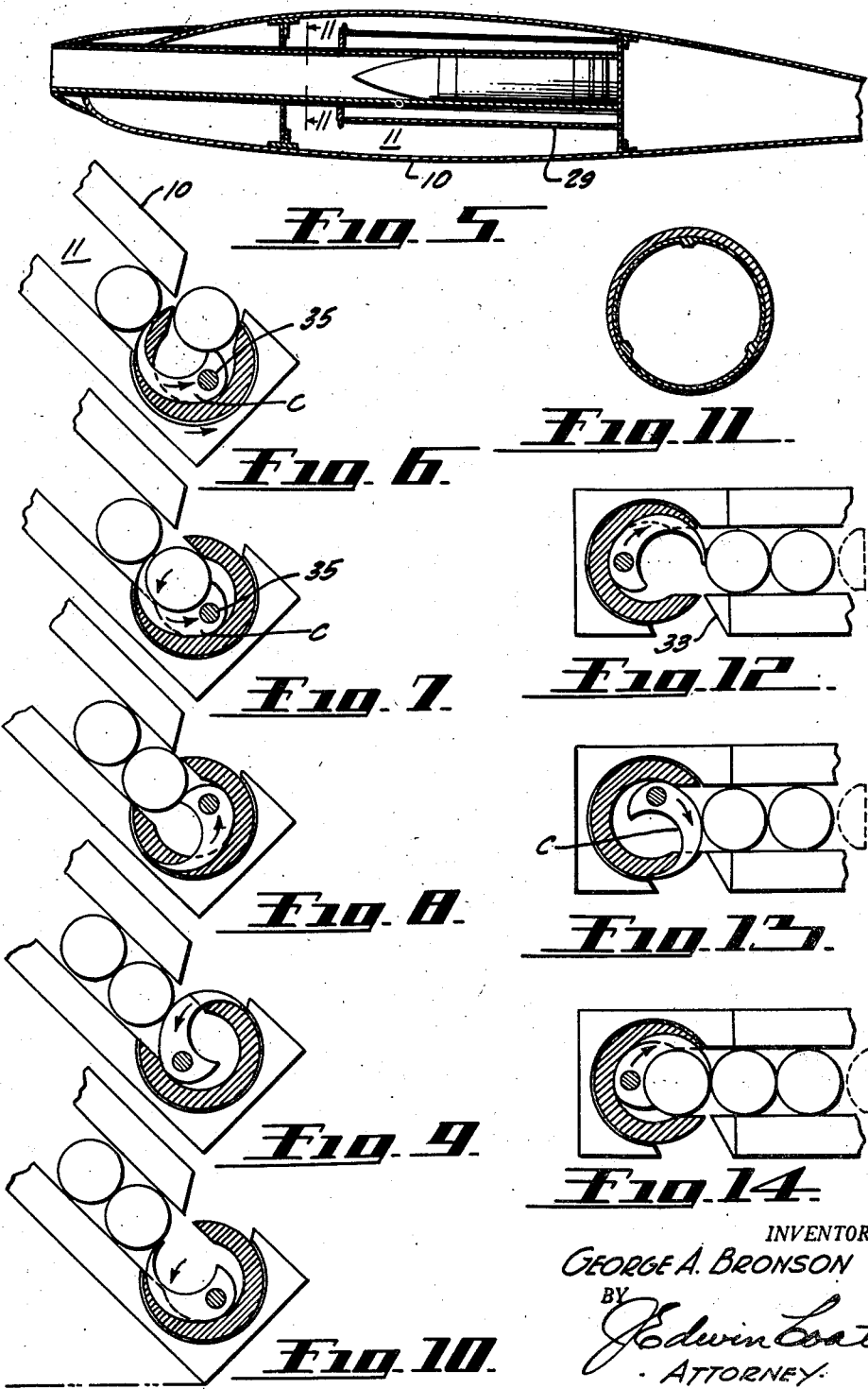

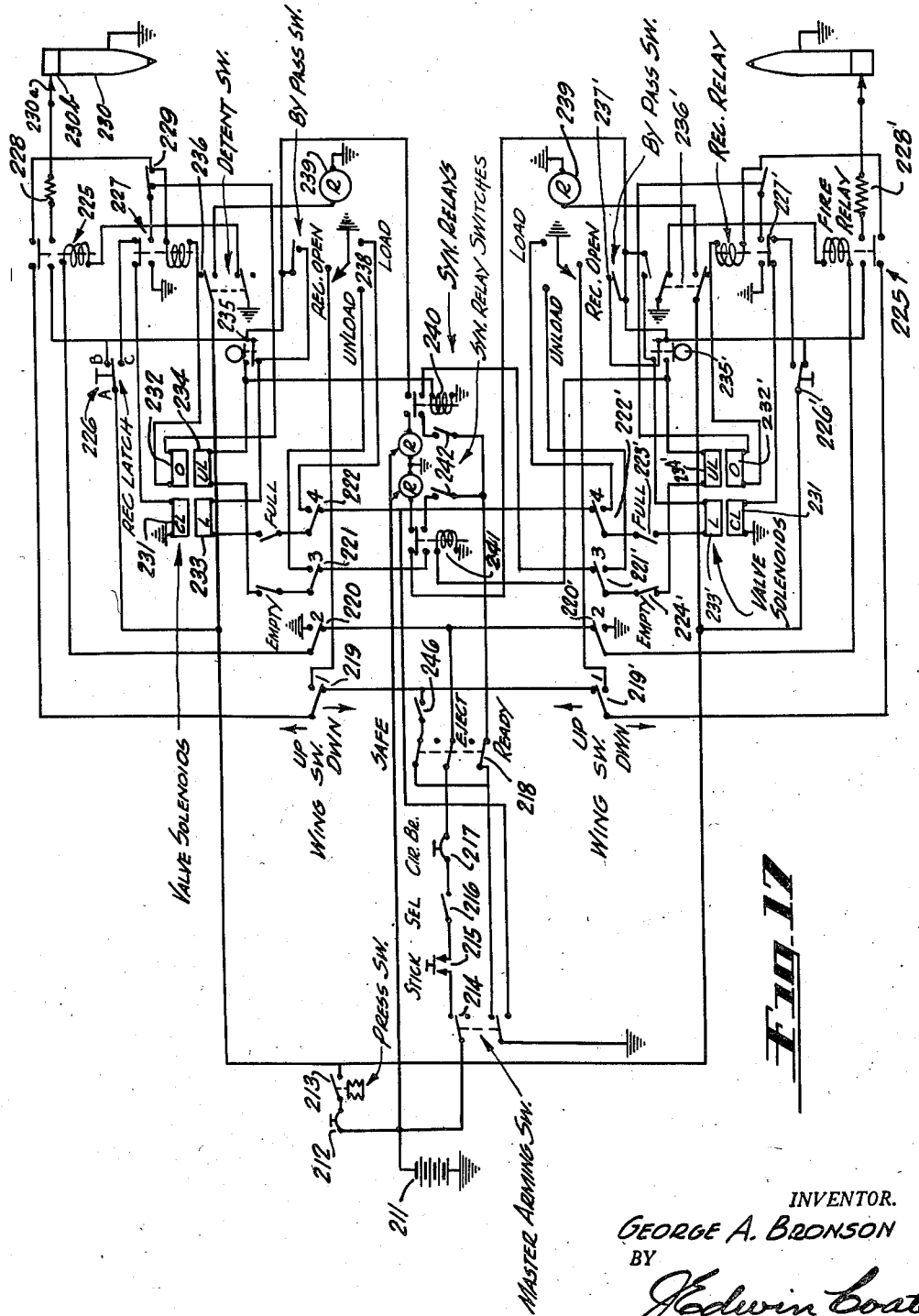

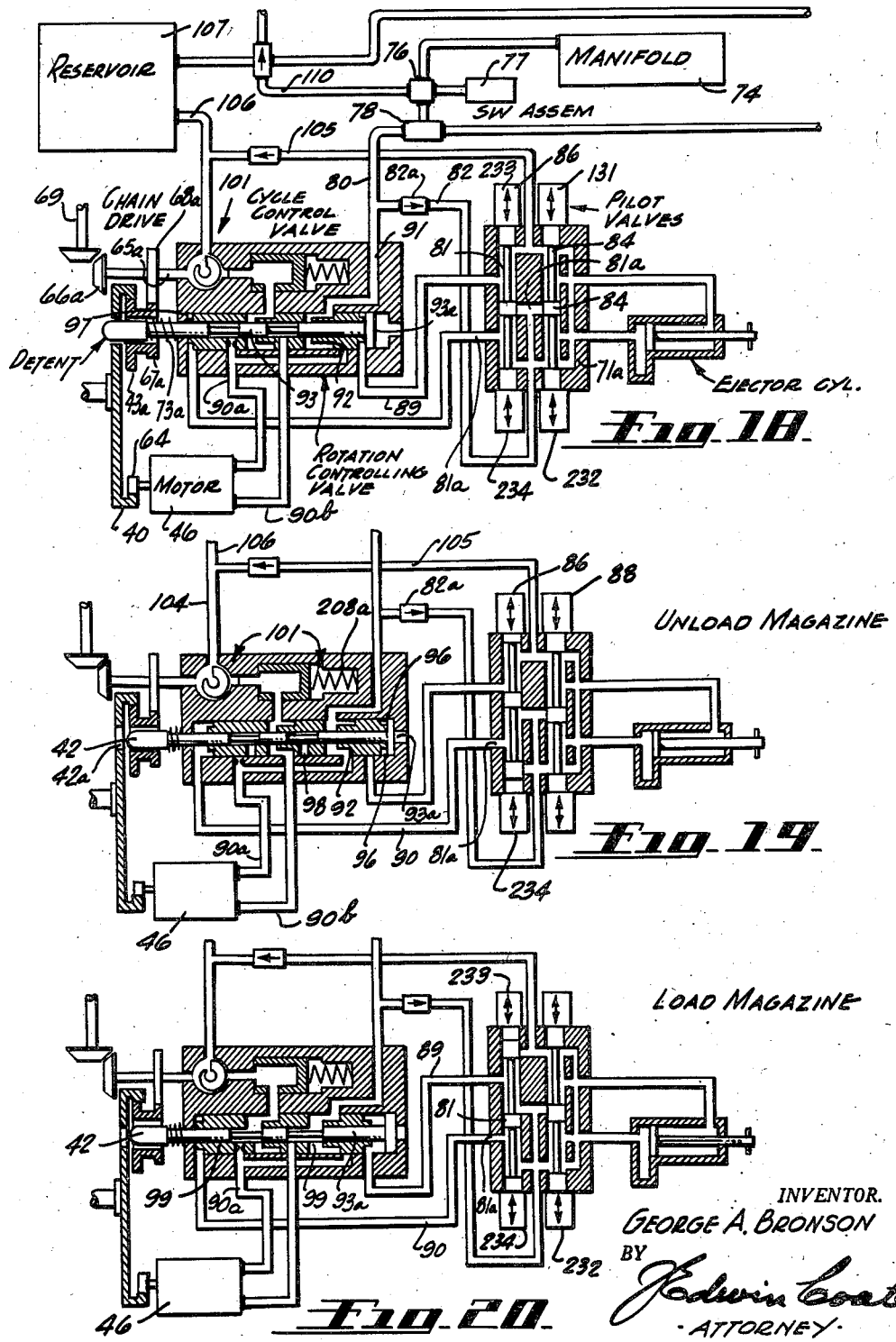

United States Patent Office 2,789,470
Patented Apr. 23, 1957

2,789,470

PROJECTILE FEED DEVICE

George A. Bronson, Santa Monica, Calif., assignor to Douglas Aircraft Company, Inc., Santa Monica, Calif.

Application August 5, 1952, Serial No. 302,779

13 Claims. (Cl. 89—1.7)

This invention relates to rocket-projectile launching devices and provides a fully automatic, magazine-type, repeating launcher constituting a new type of armament designatable as a rocket machine gun. Although primarily devised for utilization in environments where there is abundant lateral space to at least one side of it but the vertical space above and below it is rather limited, as in an airplane wing, it will become apparent from that which is disclosed hereinafter that by mere mechanical adaptations of its magazine shape and location and other minor variants, it can equally satisfactorily be employed in other types of vehicles and where the vertical space is less limited than the lateral space, as in "tanks," armored cars and half tracks, and the like. It will also become manifest that it is well suited for mounting and use in positions where neither the lateral nor the vertical space is very limited, as on the decks or in the interiors of war ships, or on the ground for use with troops as coordinated artillery.

By employment of the fullest constructional scope of the invention, it serves as a rocket machine gun, but by employment of less than the whole of its parts and functions, it may serve as a bomb rack and bomb dropper of ordinary incendiary bombs and for horizontal bombing of the "scatter" type where pin-point precision is not required, in this event the crew merely loading the device with bombs in lieu of rockets and activating the dud-ejector system, instead of the rocket firing system, to eject the bombs successively from the bottom of the wing. If so-called "accelerated" bombs are employed, rather than incendiary bombs, the "accelerated" bombs, as is well known, being so designed as to self eject themselves through the barrel and clear of the propeller disk of the diving airplane, the device may be employed in dive bombing as well as in horizontal bombing.

In any and all of its fields of utilization and modes of employment, the apparatus essentially comprises a magazine or rack for the rockets or bombs disposed in suitable lateral relationship to the firing chamber, the first mentioned component including a suitable conveyor system for translating the projectiles successively toward the firing chamber from the filled magazine; a main operating component constituting a feeder of the projectiles, moving them into, and removing them from, the first mentioned component and which may be designated a combined "receiver-feeder-firing chamber," and this main component including rotatable, centrally hollow jaw-like projectile receiving and positioning members concentric with rotatable, spirally-shaped claw-like projectile feeding members, the latter being operative to alternately cam the projectiles from the receiver into the magazine and to pick them out of the magazine and carry them into the firing chamber; ejector means for rotating the receiver and jaws respectively to "receive" and "eject" positions, the former position being for the purpose of enabling stowing the projectiles in the magazine and the latter position being in registry with an aperture in the lower surface of the wing to enable gravity ejection of a dud-projectile from the vehicle; prime mover means and controlling means for rotating the claw-like members to respectively fill the magazine and allow the conveyor or pusher to position a projectile in the firing chamber, or the bomb dropping chamber, and including means for varying the rate of rotation during a cycle so as to obviate pickup and stoppage shock and reactions; detent means, preferably associated with a firing pin, for preventing the projectile from falling forwardly out of the barrel, a firing circuit operatively associated with the detent and firing pin and operable by the pilot, and, particularly in the case of airplane installations or other twin unit installations, synchronizing means for enabling firing of the two units in unison.

Various additional elements and instrumentalities auxiliary to or cooperative with the foregoing parts or employable for accomplishing secondary results are contemplated by the invention and are set forth in detail hereinafter. For example, if the motivating force, usually hydraulic pressure, drops to zero a pressure switch automatically opens to break all the electrical actuating circuits so that the latter will not be burned out and no firing will occur. In the case of airplane employment, the entire apparatus may be rendered inoperative when the wings are folded with the airplane on the ground or flight deck so as to obviate the danger of inadvertent firing of the rocket launcher endangering personnel passing in front of the airplane. Means are also provided for rendering the first one of the two twin units in the airplane wing inoperative in case the second one becomes inoperative because of the presence of a dud in the firing chamber, or for other reasons, whereby to prevent the first unit from firing all the projectiles out of its magazine and leaving most of the projectiles in the magazine in the second wing, which occurrence would render the latter uncontrollably heavier than the first wing.

In operation, in the case where the device, as is customary, is used as a rocket launching instrumentality, the magazine is first filled with the rockets, the rockets being successively inserted by hand into the open side of the receiver, the receiver being then automatically turned, when a ground crewman operates the proper switch to such a position that the elongate side-opening therein registers with the adjacent end of the magazine. The claw-shaped projectile cams are then operated automatically to feed this projectile into the magazine, whereupon the receiver opening is again positioned to receive another hand-inserted projectile. Thereafter, the cams are again operated to urge this second projectile into the magazine, thereby also urging the preceding projectile farther into the magazine, the process being continued until the magazine is filled. At this juncture, and to load the firing chamber, the receiver opening remaining in registry with the inner end of the magazine, the conveyor is operated to urge the stack of projectiles one unit closer to the firing chamber axis. Thereafter, the cams, continuing to rotate in the same direction as that above mentioned, reach an attitude which allows the nearest projectile to be pushed from the magazine into the cams which carry it into proper position in the firing chamber, with the axis thereof aligned with the barrel axis and with its rear end registering with the tail pipe exhaust. The firing band of the rocket is automatically contacted in this position with the firing pin, which is carried by the rocket-detent group (not shown), the latter at this juncture fitting into a groove (not shown) in the rocket located on the bottom side thereof. This engagement prevents loss of the rocket out of the muzzle during a dive. Upon closure of the pilot's firing circuit, the rocket propels itself out of the barrel and the claws are rotated concurrently with inward motion of the pusher to feed another rocket from the magazine into the firing chamber. This procedure continues, at a rate achieved by the presently preferred embodiment, of approximately 180 rounds per minute, until the magazine is empty.

One of the presently preferred constructions embodying the aforestated means operating generally as recited to accomplish the objects and results of the invention is depicted in the accompanying drawings and described, part by part, hereinafter by reference to these drawings. It is to be understood, however, that this construction is only one of the many physical forms the inventive concepts may take, the invention, in fact and in law, being quite capable of embodiment in any constructional form that lies within the scope of the annexed claims, which define the mechanical principles of the invention and distinguishingly and particularly point out the novelties and advances thereof in terms of structural synthesis.

In these drawings,

Figure 2 is a section along line 2—2 of Figure 1, showing in side elevation the main sub-assembly or principal operating group that includes the means for receiving, feeding, and firing the rockets;

Figure 3 is a fragmentary rear end elevation of the construction shown in Figure 1, the wing components being here shown in solid lines;

Figure 4 is a section on line 4—4 of Figure 2 showing the ejector for rotating the receiver to eject a dud and to place the receiver in the magazine loading and unloading positions;

Figure 5 is a diagrammatic chordwise section taken along the longitudinal, vertical plane of the receiver group showing the barrel and wing structure in solid lines;

Figure 1:
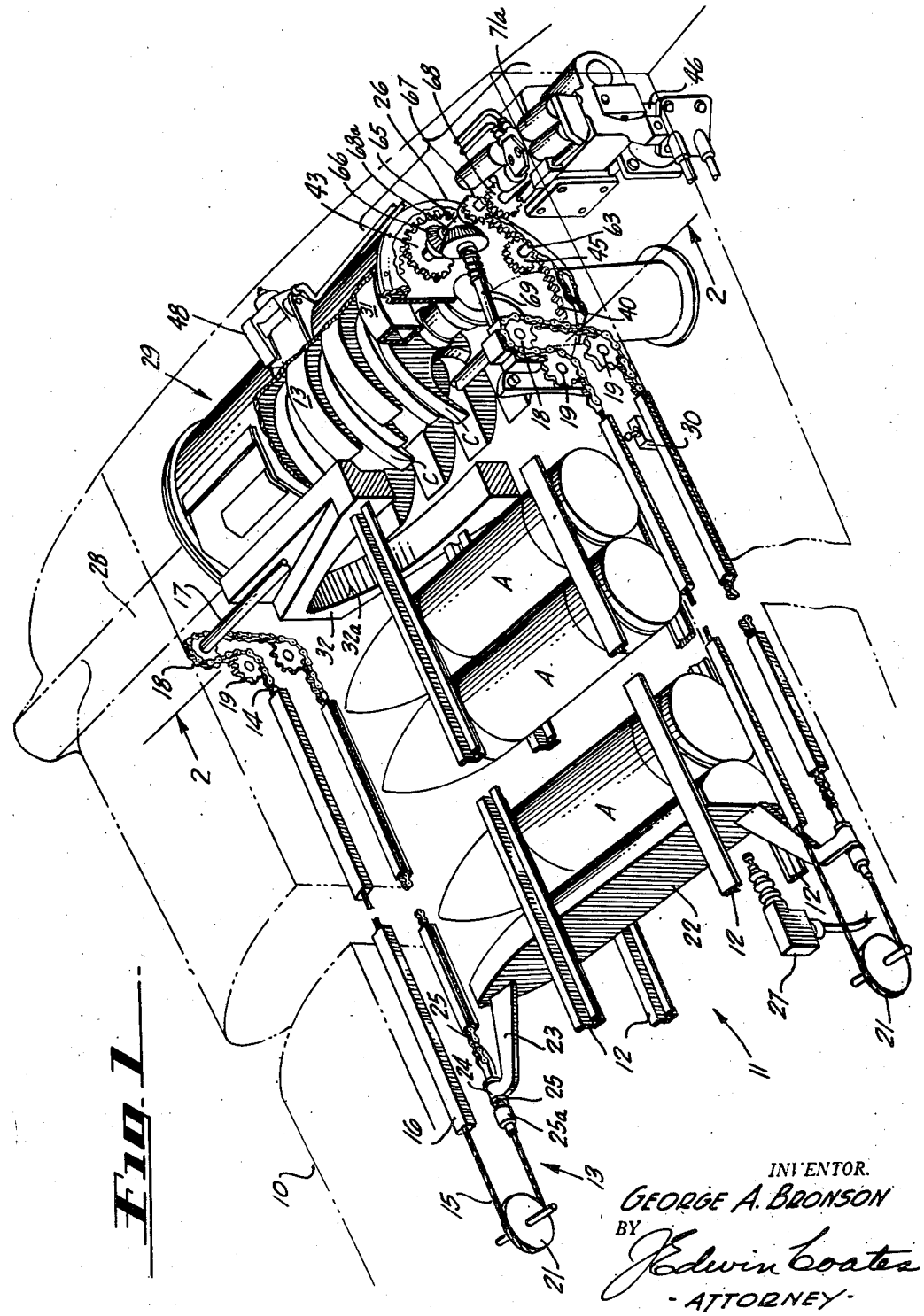
Figure 1 is a fragmentary, partially phantom perspective view of one of the present rocket firers, here shown as of the airplane type, installed in the port wing of an airplane, the starboard wing carrying an identical unit laterally configured in the opposite manner.

Figures 6–10, inclusive, are diagrammatic views, partly in section and partly in cross-section, sighting forwardly chordwise, all being longitudinal, taken to illustrate the magazine filling operations and all showing the starboard wing of an airplane folded upwardly and inwardly against the stub wing (not shown) to position the projectile's combined inlet and dud-discharging opening on the upper, outer side of the airplane;

Figure 6 shows a projectile in the magazine and one entering the receiver;

Figure 7 shows the latter projectile entering the claws with the receiver in registry with the magazine;

Figures 8 and 9 show the claws camming the projectile;

Figure 10 shows the completion of the projectile-stowing operation;

Figure 11 is a cross-section of the barrel, showing the three lands provided thereon for maintaining the barrel true and for allowing the airstream to pass therethrough without ramming;

Figures 12–14, inclusive, are diagrammatic fragmentary longitudinal sections and cross-sections, sighting chordwise aft, all being taken to show the gun-loading operation with the conveyor urging the stack of projectiles toward the firing chamber, the wing being horizontal, Figure 12 showing the projectile abutted against the pickup claws now revolved mutually oppositely to their initial attitude, Figure 13 showing the claws displaced laterally inwardly by rotation with the projectile moved inwardly by the conveyor, and Figure 14 showing the claws in their projectile receiving and supporting attitude;

Figure 15 is a longitudinal section of the receiver-rotating and dud-ejector group with its associated pressure switch;

Figure 16 is a fragmentary, vertical secantwise section of the rear end of the receiver group, showing the driving means for the projectile-camming unit and the mounting and sealing means for the receiver with respect to the end plate of the camming unit;

Figure 17 is a diagrammatic view showing the electrical system of the apparatus and its cooperation with the main electrical system of the airplane, both serving for activating or controlling the various prime movers and movable components of the apparatus;

Figure 18 is a diagrammatic view of the apparatus' hydraulic system for operating the claw unit and the detent thereof, the conveyor drive, and the ejector return or readying system, and including parts of the basic hydraulic system of the airplane, the hydraulic components and the projectile feeding components being shown in their inactive positions;

Figure 19 is a similar view showing the hydraulic piloting and controlling valves in the positions wherein they effect rotation of the claw unit in the magazine filling direction;

Figure 20 is a similar view illustrating the aforesaid members in the positions wherein they effect rotation of the camming unit and translation of the projectile pusher into the ready-to-fire position; and Figure 21 is an enlarged transverse, sectional view of the actual cycle control valve configuration, showing the rotor and the governor thereof in coaxiality instead of developed laterally and diagrammatically as in Figures 18 to 20, inclusive.

The structural parts and the constructional relationships thereof to constitute one wing-mounted unit will first be described without detailed reference to the electrical and hydraulic systems for operating the various mechanisms constituting the unit. The organization and action of these latter systems will thereafter be described in connection with the successive operating phases of this unit.

Each unit, as shown most completely in Figures 1–5 inclusive, comprises a wing 10, constructed to provide a spanwise elongated chamber 11 extending from a chordwise line near the wing tip to a chordwise line near the wing root and having a dimension in the direction of the wing's thickness sufficient to accommodate a considerable number of rockets and their racking, conveying, feeding, firing, dud-ejecting, and other mechanism.

The racking and conveying mechanism, in one embodiment, comprises tracks 12 constituted by parallel, vertically and longitudinally spaced rails suitably rigidly mounted in the magazine portion of wing 10 and power transmitting endless members 13 made up of sprocket chain portions 14 and cable portions 15, the conveyor runs being passed through guide tubes 16 which are longitudinally slotted along their inner faces to permit brackets 23 to move therethrough. The return bends of the inboard ends of the endless conveyor members are drivenly engaged with a conveyor drive shaft 17 by means of driver sprocket wheels 18 fixed to each end of the shaft 17, being directed towards and away therefrom by idler sprocket wheels 19. The latter are mounted on suitable stub shafts, not shown, the stub shafts being suitably mounted on brackets in the wing framework as shown. The pair of endless conveyor members passes at its opposite ends around pulleys 21 mounted on suitable stub shafts. The conveyor drive shaft is rotatably mounted at its aft end in a gear box 26, which, together with the drive sprockets, are supported in a bracket, not shown, but of any suitable conventional nature, and take the driving loads. The forward end of shaft 17 is similarly supported but lacks the gear box which is not needed.

A projectile urger or pusher 22 is disposed transversely across the outboard end of the magazine and is connected at each of its opposite ends to the adjacent lower run of the conveyer lines by means of bracket arms 23, the connection being made in an adjustable and disengageable manner by means of suitable clamping members 24. The arm clamping means may include a pair of nuts 25 reachable towards each other on the threads of terminal rods to clamp the arm between them. These mounting and connecting means may also include cable tighteners 25a.

Located near the outer end of the magazine and adjacent the outermost travel position of the pusher 22 is an electrical "magazine full" switch 27, mounted on suitable supports, not shown. Its plunger is contacted by the pusher when the latter is in its outermost position in order to open a suitable circuit shown in Figure 17 and decribed in connection with the electrical operating system of the rocket launcher. This circuit opening prevents further loading of the magazine, as will hereinafter appear.

The rocket gun itself broadly comprises a barrel 28 disposed chordwise of the wing near the root thereof and protruding from the leading edge thereof. The remainder of the gun unit comprises a cylindrical housing 29 disposed rearwardly eccentrically of the barrel and communicating with the rear end thereof, being fixedly supported on the barrel at its forward end, its rear end being supported by a single bolt, not shown, but extending horizontally between the central region of the rear end of the receiver and the rearwardly adjacent cycle control valve housing, both ends of the bolt being mounted in spherical bushings. In order to counteract oscillation of the housing incident to this type of mounting, a torque link, not shown, but suitably slotted at each end, may be passed from a point on the housing 29 intermediate its ends to the outwardly adjacent chain bracket, being suitably connected at each end to the adjacent structure. Housing 29 encloses the principal part of the mechanism for filling the magazine, loading the gun, firing same, and ejecting duds. Within this housing and spaced radially inwardly only a short distance therefrom is a concentric member 31, Figure 4, designated as a receiver (see also Figure 16). A plate 32 having an aperture 32a fitting the profile of a rocket and providing a silhouette seal therefor is attached to the open outward side of the shell 29 and a dud discharge opening 33 is formed in the bottom of the shell, extending through the skin of the wing and serving also to discharge a portion of the rocket blast. A main blast exhaust tail pipe 34 is provided at the rear end of the receiver, is connected at its forward end thereto, and has its rear end extending downwardly through the bottom of the wing. The housing 29 and the receiver are closed at each end by end plates 31a, the outer periphery of this closure plate being sealed gas tightly to the outer periphery of the receiver by means of a sealant 31b, Figure 16. An F-shaped seal, carried by inner end plate 35a and supporting a seal ring 37, is disposed between the receiver 31 and the two closure plates 31a at each end of the receiver. To aid in accomplishing this end, an annular flange 38 is formed on the inner end plate 35a and bears two ball bearings 39 on its outer periphery, suitable seals 39a being provided near the aft end of flange 38.

The inner surfaces of the receiver bear a plurality of longitudinally spaced jaws B, Figures 1, 2 and 4, in the form of partially circular disks or plates open at their centers and also open at one side portion of their periphery. These disks are rigidly attached at their outer peripheries to the adjacent surfaces of the receiver 31. A shaft 35 is disposed longitudinally of the receiver 31 and is mounted for revolution around the center line of the receiver in an orbital path. The shaft 35 bears a plurality of longitudinally spaced cams C of claw-like shape or, more specifically, having the form of portions of evolute spirals.

A resiliently-mounted rocket, or rounds, detent 130a constructed and functioning to engage successive rockets, is positioned at a point on the lower inner periphery of the receiver housing shell 29, and serves to prevent the rocket in the firing chamber from falling forwardly out of the muzzle when the airplane dives. Shell 29 also includes a resiliently-mounted contact member 230a engaging the firing band of the rocket for use in firing the rocket, as shown in Figure 2.

A ring gear 40 is formed on the inner periphery of the flange 38 of plate 35a to enable the cam unit to be rotated in the magazine filling and projectile feeding operations as and for the purposes later described.

A horizontally disposed longitudinally reciprocatable latch and valve core member 42 is provided adjacent the rear end of the rotatable end plates, being carried by a member later described, and is adapted for movement into and out of an aperture 42a in the end plate of the cam-unit to both lock the cam-unit and to serve as a "valve inside" for cutting off motivating pressure fluid flow to a motor that rotates the cam-unit. The ring gear 40 meshes with a spur gear 43 for operating a valve, later described, for controlling the cycle of operations of the rocket machine gun. A spur gear 45 is provided in adjacency to the lower periphery of the ring gear 40 for rotating the cam-unit through the agency of a hydraulic motor 46.

For the purpose of ejecting a misfire, or "dud" rocket, the receiver is rotated to place the opening defined between the jaws thereof in registry with the opening provided in the lower face of the wing, gravity thereupon withdrawing the loose rocket from the firing chamber and out of the airplane. To this end, an ejector unit 48, as shown in Figures 4 and 15, is provided on the medial portion of the length of the upper, inner side of each rocket launching unit in each wing. The ejector unit includes a dust-casing 48 and is supported in a mounting bracket in turn suitably framed with the shell or housing. This unit includes a cylinder 50 projecting laterally through the bracket and closed at opposite ends by heads 50a and 50b. Reciprocatably mounted within the cylinder is an actuating piston 51 terminating at the one end in a pivoted connection 51a, one of the members of which is carried by one of the jaws B. The head of the piston bears against a cup 51b within which is mounted a spring 52. Projecting into an annular recess 52b in the upper part of the cylinder head 50a is a latch 53 continuously loaded by a latch-loading spring 55 seated in a cup-like lateral extension 56 of the ejector casing, and the cup-like member extends into contact with the end closure of the casing. The latch is adapted to be retracted by means of hydraulic pressure applied through a line 59, such retraction also allowing the same hydraulic pressure to force the piston 51 downwardly, cup 51b being forced to follow the movement of the piston by the expansion of the spring 52 until the cup bears against the head of the bolt 61. If the hydraulic pressure in the conduit 59 then drops to zero, the latch 53 cannot return into the piston-groove, as its path will be blocked by the cup 51b.

In order to enable the ejector to follow a circular path, its outer end portion is pivoted as at 49a to a bracket 49, its inner end being pivoted to a member B at 51a, in the manner heretofore described.

The ejector group is operated at certain junctures to eject a dud and at other junctures to position the receiver in upwardly opening attitude for loading the magazine and in laterally outwardly opening attitude to load the magazine and to receive from the magazine, a rocket to be fired. The receiver is moved to its jaws upward, or open, position by the action of the ejector unit 47. The pilot can operate his "eject" button 246 because the circuit is now grounded through the ground connected to relay 225.

Another pressure switch unit 213, located elsewhere in the craft, serves to interrupt the electrical current to either firing chamber if the hydraulic pressure drops below a predetermined value. The switch contacts 226 of Figure 17 are inside the switch 57 of Figure 15 and are closed when the latch 53 occupies the groove 51c. The spring 55 constantly tends to urge the latch 53 into said groove, the other spring, 58, being an over-travel spring provided and organized as shown to prevent damage to this switch 57 by over-travel outwardly of the latch 53. Spring 58 provides a resilient connection between the latch 53 and cup 53a which contacts button 57a of switch 57. Upon application of hydraulic pressure through line 59, the latch is urged leftwardly allowing spring 52 to force its carrying cup downwardly into contact with the head of the stop bolt 61 as piston 51 moves downwardly. This leftward movement of the latch actuates the switch 57a. If the hydraulic pressure should fall below said predetermined value, the latch will, of course, be prevented from returning into its groove by the carrying cup, which is now, of course, occupying the space radially opposite the latch, this action holding the switch 57a in such a position that it energizes a circuit illuminating a light on the instrument panel that indicates that the pison 51 is unlocked. A hydraulic pressure input line 60 is provided in the lower end of the piston-cylinder unit for the purposes of urging the piston 51 upwardly into its position against the action of the spring 52 thereby to place the receiver jaws B in the position shown in Figure 4. The latch 53 then returns to its groove in the piston head thereby effectuating actuation of the switch 57a to indicate that the piston is latched.

The prime mover for motivating these, and all the other, movable parts and mechanisms and the conveying and positioning components except the ejecting unit is the aforementioned hydraulic motor 46 mounted in the wing below and inboard of the tail pipe provided for the exhaust of the rocket blast from the firing chamber. From the motor 46 a power input shaft 63 extends forwardly and terminates in a driving spur gear 45, as aforestated, which meshes with and drives the ring gear 40. The latter, through a spur gear 43, rotates a driving shaft 65, Figure 1, or 65a, Figures 18–20. Intermediate the ends of shaft 65 is mounted a bevel gear 66. In Figure 1, shaft 65 terminates rearwardly in a driving spur gear 67 for meshing with a driven spur gear 68 mounted on the forward end of a cycle control valve shaft 68a. A power transmission shaft 69 terminates at its one end near the shaft 65 and at its other end drivingly engages the sprocket drive shaft aforedescribed. Bevel gear 69a on shaft 69 takes off power from the shaft 65, to this end meshing with the bevel gear 66.

The cycle control valve unit is mounted in a housing or box 70 which may also contain the rotation controlling valve, as shown in Figures 1, and 18–21, inclusive.

The hydraulic system for motivating the prime mover 46 and for controlling its direction and power of rotation as well as for actuating the ejector mechanism is illustrated in Figures 18, 19, and 20 and is operated with pressurized hydraulic fluid supplied by means including a pressurized fluid inlet manifold 74, having a conduit 75 leading therefrom through a cross fitting 76 that includes a hydraulic switch 77 operable to energize or to de-energize the system. From the cross the fluid passes to a two-way fitting 78, the fluid flowing to the rocket launching unit in the right wing through a conduit 79 and to the similar unit in the left wing through a conduit 80.

The valve arrangement and mechanisms for controlling the rate and direction of rotation of the motor 46 includes the two casings 70 and 71, the casing 70 including the motor rotation controlling valve 92—93. The latter is of the dual type consisting of a single-piece, slidable multi-ported sleeve 92 and a ported rod or core 93 slidably mounted concentrically therein, the latter having a head 93a at its right end adapted to contact sleeve 92 and to be driven to the right thereby under certain circumstances and terminating leftwardly in the aforementioned plunger 42. When this plunger is not opposed by fluid pressure, it drops into aperture 42a in the ring gear plate aforedescribed when the latter is in the position shown in Figure 18.

The cycle control valve includes the main portion 101 shown integrated with casing 70 in Figures 18, 19, 20 and the regulator portion 101a which are actually coaxial, being shown laterally displaced in casing 70 for purposes of clarity. It is driven at the same rate as the ring gear by the intermediary gears shown and described hereinabove. The amount by which member 101 restricts the return to reservoir 107 determines the rate at which the rocket feed mechanism operates. In feeding the rockets into firing position, it is desired to apply full hydraulic power at the beginning of the stroke in order to build up the speed of the movement quickly and then to taper off the power so that the stroke will end gradually. The rotor 203 effectuates this action when turned clockwise, the governor sleeve 207 metering the flow from the drive motor 46 to limit the maximum pressure drop which can be applied to the rotor 203.

Figure 18 shows the positions of the parts when the device is at rest. Plunger 42 occupies aperture 42a and all ports through the motor rotation controlling valve are blocked. Pressure fluid then extends through conduits 80 and 82 to valve 81 and to the dual valve 92—93, and the cycle control valve is wide open as best seen in Figure 21. The contacts 235 of rounds position switch 130a (Figure 4) in the rocket chamber, and shown in Figure 17, when under depression by the rocket body, holds open the circuit through the solenoid 234. The feed device is started by operating the switch of solenoid 234 manually. The rocket is fired by pressing the firing button on the control column, and when the rocket leaves the chamber the pin rises, closing the circuit through solenoid 234 and forcing valve 81 upwardly.

Referring now to Figure 19, it will be seen that movement of valve 81 opens port 81a to line 90. Fluid pressure is then applied to the left end of sleeve 92, moving it to the right. Its contact with head 93a has also moved core 93 to the right and removed plunger 42 from aperture 42a. Line 80 is now directly connected to line 90a and lines 104 and 106 are now directly connected to line 90b, both through aligned ports in the motor rotation controlling valve. Motor 46 is energized with full power and rotates the ring gear which moves the load and also rotates valve 203. As the latter approaches completion of its cycle, the power decreases gradually to provide for an easy stop. The governor valve 207 merely acts at all times to maintain a constant pressure by maintaining constant the quantity of fluid passing through the cycle control valve.

Shortly before completion of a full cycle, the new rocket is pushed into the firing chamber far enough to again depress the switch 235 and break the circuit through solenoid 234. Valve 81 then returns to neutral and the motor control valve is no longer forced to the right by fluid pressure. Spring 73a urges plunger 42 to the left but it encounters the blank wall of the end plate 35a that carries the ring gear so that the aforementioned ports remain open but the mechanism is gradually slowing down since the outlet through the cycle control valve is being reduced. Just as the cycle is completed, aperture 42a becomes aligned with the plunger which is immediately spring-urged to the left, closing the ports and stopping the device. It will thus be seen that each full cycle of the hydraulic system starts with the firing of a rocket and ends with the location of a new rocket in position for firing.

The direction of motor rotation may be reversed for the purpose of enabling rockets to be loaded by the cams through the exit opening in the shell and receiver into the wing magazine. This is accomplished by manually closing a switch that actuates solenoid 233, which moves valve 81 to its lowermost position as shown in Figure 20, connecting port 81a to line 89. The position of the middle piston or obturator of the valve-unit 81 now prevents fluid that may enter by line 80 from passing into line 90. Fluid pressure is now applied at the right end of the valve 92—93, between sleeve 92 and head 93a, moving the core 93 to the right but not moving sleeve 92, with the result that the ports are so connected, referring to Figure 20, as to cause the fluid to flow through the motor in the opposite direction and all parts rotate oppositely. The fact that the cycle control valve now rotates in the wrong direction is immaterial because it is desired to load the magazine very slowly and the restriction 90c in the return line 90a is so great that it controls the speed at all times during loading.

The cycle control valve comprises, as best seen in Figure 21 (which is a cross-section of it removed from 70), a hollow casing 200, actually integral with casing 70, an inlet port 201, and an outlet or return port 202. A rotor body 203 having a central bore 204 is rotatably mounted in the casing 200 so that the drive gear 68a, diagrammatically shown in Figure 18, actually rests against a shoulder at the adjacent end of the casing and provides a retainer for one end of the rotor body, the opposite end of the rotor body being provided with suitable retaining means, not shown but including within its scope such well known mechanical expedients as a groove carrying a retaining ring.

The rotor body is provided with an inlet port 205 and an outlet port 206 and is formed in the shape of a cam adapted to alternately open or restrict the port 202 as the rotor is rotated. A pressure regulator, or metering or governor valve, 207 is housed in the body for longitudinal sliding movement against a spring 208a shown in Figure 18. A plurality of inlet ports 208 is formed near the one end of the valve 207 and a plurality of outlet ports 209 is disposed near the other end thereof, the two sets being shown in staggered section. With the spring extended and the regulator valve in normal operating position, the ports 208 and 209 correspond in spacing to the inlet ports and outlet ports of the rotor body.

In operation, the pinion of the cycle control valve is driven by the ring gear 40. Since the casing 200 is fixed, the rotor body, keyed to the gear 68a, is caused to rotate relative to the casing. Fluid which has passed through the motor 46 enters inlet ports 205 and 208 and finally leaves the cycle control valve through outlet port 202. As the enlarged portion of the rotor body approaches the outlet 202, the quantity of fluid permitted to pass through this port is so reduced that pressure builds up in the hollow body 207 so that when the pressure exceeds a predetermined set resistance of the spring 208a, the body 207 is moved rightwardly, as seen in Figure 18, so that the inlet passage thereinto is restricted in size. This action restricts the rate of movement of fluid through the motor and thus slows down the rate of rotation of the motor and the cams-unit driven thereby.

The various mechanisms described hereinabove and correlated structurally as shown and described are operated in coordination to effectuate filling of the magazines, feeding of successive rockets therefrom into the firing chambers, firing the rockets, and ejecting "duds" by the electrical and hydraulic means constructed and correlated therewith as shown in Figures 17–20, inclusive. It is to be understood that switches 219, 221, 222 are operated by the folding movement of the wing; switch 236 is operated by the detent 42; the by-pass switches are operated by a cam on the cycle control valve; switch 235 is operated by the rocket, switches 221 and 229 are operated by the receiver, and that substantially all the other switches are operated manually.

First, in order to fill the magazine shown in the wing with a store of projectiles, the outboard panel of the wing is elevated and folded inwardly against the fuselage as shown in Figures 1–6, inclusive, the outboard panel of the starboard wing being therein shown while the outboard panel of the port wing is shown in Figure 1. This disposition of the wing parts exposes the combined dud-discharging aperture and rocket loading and unloading aperture 32b in the shell or housing, as shown in Figures 6–10, inclusive, the folded disposition of the wing parts positioning this aperture in an upward and outwardly facing attitude. The receiver 31 is opened, that is, revolved to position its jaws into the attitude shown in Figure 6, upon rotary action of the ejector 48. In order to accomplish these effects, and contemplating only one wing and one rocket machine gun at a time, the ground crew man manually moves the switch 238—Figure 17—against the contact designated "receiver opened," whereupon electrical current flows thence through switch 219 (which is the wing-switch in its "wing-up" position), thence through relay 227, operating same. In the operation of relay 227, the current passes from switch 213, through switch 236, to relay 227, which is grounded through 225; through switch 219 in its "up" position, through switch 238 and thence to ground. Thus, no coil is needed across relay 227 leading to the relay's ground, because it has a ground to the left through 229 and 238 when its contact is closed. Switches 214, 215, 216, 217, 218 and 246 are, at this juncture, in an inoperative condition and remain so during this entire procedure. These actions ground the circuit through the ground shown connected to the relay 225 which enables the pilot, when it has become necessary for him to push his "eject" button, to release his pressure on the eject button 246 since it is retained in its circuit-closing, "holding" position by the ground circuit. This ground circuit is completed from the ground shown associated with relay 227 to the ground shown associated with the lower arm of the master arming switch 214.

From the closing relay 227 the current, by means including switch 229, is passed through the solenoid 232 of the piloting-valve shown in Figures 18–20, inclusive, and thence passes via switch 236 to the positive terminal 211. In passing through switch 236, the current also passes through the relay 227, thereby pulling its switch blade out of the conductor path that includes switch 226. The hydraulic pressure from the outlet of unit 232, Figure 17, then urges detent 53 out of the notch in piston 51 and also actuates this piston, thus urging switch 226 into the "A–C" position and thereby effectuating unlatching of the receiver prior to its rotation. Incidentally, when the receiver is returned to its "up," or open, position, the receiver latch 53 in the ejector units drops into its anchoring aperture 51c provided in the receiver ejector unit and effectuates switching of the receiver latch switch 226 back into the "A–B" position, thus de-energizing the "close" solenoid 231.

Through the action of the hydraulic mechanism previously described in connection with Figures 18 to 20, inclusive, and including the action of the ejector piston 51, the receiver is then moved into the "open" position shown in Figure 6. When the receiver is open to its fullest extent, switch 229 then opens by virtue of its cam dropping into a suitable depression not shown in casing 29 and de-energizes the valve-opening solenoid 232 to prevent the latter being burned out by continuous current flow.

The ground crew man then manually inserts a rocket as, and in the position, shown in Figure 6 and opens switch 238 to enable the various instrumentalities shown to close the receiver. With switch 229 already open, the opening of switch 238 de-energizes the solenoid of relay 227, allowing the spring-loaded switch blade of the relay to move into a position completing the circuit through the solenoid 231 that closes the pilot-valve.

Thus, at the end of this phase of the magazine loading operations, the receiver contains a rocket. The next phase of the operation comprises feeding the projectile into the magazine from the receiver, and to this end the switches 238 are first thrown into "magazine load" position. Current thereby passes to ground and through switch 222, which has been closed by movement of the wing, as were switches 219 and 221, thence through the "full" switch 223 which is merely a permissive switch, permitting it to operate until the magazine is filled. The current then passes through the solenoid 233 and opens the hydraulic circuit that terminates the conduit 90b and operates to rotate the cams in a direction to effectuate filling of the magazine 29. Thence the current passes through the bypass 237 for reasons hereinafter becoming manifest, through the receiver latch 226 and thence to the positive terminal 211 of the circuit. This action effectuates retraction of the plunger 42 and actuates the hydraulic motor 46. At the same time this action breaks the circuit through the detent switch 236, thereby rendering the firing relay 225 inoperative, the receiver relay already having been rendered inoperative by the opening of switch 238, and also interrupts the flow of current to the receiver controlling relay 227, thereby immobilizing the receiver and preventing rotation thereof.

The end result of these actions is that a rocket has been forced by the cams to move upwardly into the magazine 29.

While the detent 42 and the exhaust aperture in the plate 35a are passing each other, the magazine loading-controlling solenoid 233 is maintained in an energized condition by means of the circuit through the bypass switch 237 in order to hold the detent 42 out of the aforesaid exhaust aperture, since detent 42 is intended to enter only detent aperture 42a.

The cams are now rotating to cam a rocket upward into the magazine, as shown in Figures 8–10, inclusive. Just before the cams reach the "up" position of Figure 9, switch 237 is opened by a cam on cycle control valve 70, resulting in de-energization of the magazine-loading solenoid 233. Eventually the detent engaging aperture 42a and the plunger 42 register, allowing the inner valve of the valve-within-a-valve to shut off the motor.

This last-mentioned step completes the operations necessary to place one rocket in the magazine. To fill the magazine, it is only necessary to repeat these operations as many times as there are rockets to be loaded into each magazine.

When the magazine is filled, the magazine—full switch 223 contained in housing 27 automatically opens because it is actuated by the pusher 22 and the receiver and claws concurrently cease their receiving and feeding movements, the detent 42 entering aperture 42a at this juncture. To enable the device to operate in the firing direction, of course, the detent must be removed from the aperture, as described.

Before commencement of the operations for effectuating loading of the firing chambers, the wing, hereinafter taken to be the port wing, is, of course, lowered to its horizontal, or flight, position. Also before beginning loading of the firing chambers the following conditions must exist: the magazine must contain rockets and both firing chambers should be empty; the hydraulic pressure must be in full force, and the pressure switch 213 must be closed. Then, to initiate chamber-loading, and considering the electrical and other devices in but one of the wings, since those in the other wing are duplicates, the master armament switch 214, see Figure 17, controlling the supply of energy to all of the armament devices of the airplane, is shifted to the "on" position, energy being thus applied through the circuits shown to the firing relay 225 assuming switch 213 to be closed. This operation also provides a grounding condition for the operations necessary to load the magazine. Current accordingly, flows from source 211 to the electrical element 212—a circuit breaker—and thence to electrical member 213; therefrom it flows to member 226 in Figure 17 and thence to member 235. Since no rocket occupies the chamber, current then passes through solenoid 234 and through the coil of relay 240 and actuates the hydraulic system, effecting shifting of a rocket from the magazine to the adjacent chamber. Simultaneously, the devices in the other wing half urge a rocket to the adjacent chamber. From solenoid 234 the current passes to the member 224; thence to member 221, thence to part 241; thereafter to part 242; thence to part 218, therefrom to part 214 and finally to ground. At the same time, solenoid 234 is energized by switch 235 and current passes through the coil of relay 240 and thence to ground, actuating the relay 241 and urging the lower contact thereof into such a position that the circuit therethrough is closed, thus closing the circuit to ground through solenoid 234.

The coil of relay 240 is, of course, controlled by the electrical actuating member of the lefthand or port-wing unit, the coil of relay 241 being controlled by similar means in the righthand unit. When there is a dud in the starboard chamber, relay 241 is not affected for it is controlled by the port wing electrical system and not by the starboard wing system. If there is no rocket in the righthand firing chamber relay 243 is energized and allows the circuit to the solenoid associated with 240 to be completed so that a rocket can enter the lefthand firing chamber. If there should happen to be a "dud" in the righthand firing chamber and the lefthand chamber has fired and is empty, the circuit through member 234 cannot be completed because of the condition of relay 241, until the round in the righthand unit has been ejected by the "dud" ejector. Since both chambers are fired simultaneously, when a round is positioned in the lefthand chamber the circuit through the coil of relay 240 is broken so that the relay moves automatically to the upper contact thereby effecting illumination of the indicator light 244, located, if desired, in the pilot's cockpit.

The lights 239 are illuminated when plunger 42 pulls out, this retraction actuating switch 236, which breaks the firing circuit and effects illumination of the lights 239.

When the firing chamber of the one rocket machine gun, say the starboard gun, is empty but there is a live round in the firing chamber of the other, or port, gun, as when a dud has been ejected from the starboard chamber, the port wing electrical system controls the subsequent operations in both wings.

Current from the source 211 passes through the now closed switch 212 and pressure switch 213 dividing to now closed receiver latch switches 226 and 226' in the starboard and port wings, respectively, which switches are both in the A–B position. Starboard rounds switch 235 is now in the closed condition because of the absence of a rocket but the corresponding port switch 235' is open because a rocket is in place in this firing chamber. From switch 235, current passes to the actuating coil of "unload" solenoid 234 in the starboard wing to rotate the now unlatched receiver into rounds-receiving position. Thence the current passes of course to the "empty" switch 224, to the magazine switch 221, through the port relay 241, closed by the presence of a round, thence through thereby closed synchronizing relay 242, thence through "ready" switch 218, thence through master arming switch 214 and thence to the energy source 211.

In order to effectuate these operations, in the starboard wing the current has of course been passing from relay 240 to relay 241 in the port wing closing same to close the circuit through 242, 218, 214 and back to source; closing relay 241 also now closes port rounds switch 235' and hence closes the circuit through the actuating coil of port unloading solenoid 234', port empty switch 224', port magazine switch 221' through closed relay 240, through closed synchronizing relay 243, through closed switch 218, closed master armament switch 214 and thence to the energy source, 211.

The plunger 42 having been retracted, both conveyor units urge a rocket from the inboard end of the adjacent magazine into the camming units now in the proper attitudes in the respective firing chambers. A rocket now bears on each rounds indicating switch 235, both detents move into their apertures and all the movable parts cease to move. Each unit is now ready to discharge a rocket.

The circuits and electrical and mechanical instrumentalities are designed and arranged to synchronously fire a rocket from each wing. In firing, and now tracing current flow from the negative side or righthand side of Figure 17, to the positive side, as in electronic flow, for purposes of simplicity, the current passes from the ground shown associated with each rocket through the firing band 230b of the rocket and through resistors 228 and 228', which are provided to prevent a short occurring if the rocket firing band should happen to be grounded inadvertently, therefore permitting the use of much lighter electrical components. From the firing band the energy passes through firing relays 225 and 225', through the receiver latch switches 226 and 226' and thence through switch 212 to terminal 211.

Relay 225 is actuated by current passing from member 211 through members 214, 215, 216, 217, 218, 220, 225, 236, and thence to ground.

Manually operable selector switch 216 enables the pilot to choose whether to fire the rockets or drop the bombs in the bomb bay of the fuselage.

When the wing is up, switches 220 and 220' are thereby open and in contact with the ground, as shown, and the wing has to be moved and these switches have to be closed before the rocket machine gun can be fired. In fact, there are six safety-affording instrumentalities in the apparatus and they all have to be closed to render them current-passing, or operative, before either rocket gun can be fired. They are: the ready switch 218, which must be closed before firing; the master armament switch 214, which must also be pre-closed; the wing switch, which will open after the wings are pulled upwardly and break all firing circuits; the detent switch 236 and 236' which, if open, breaks the firing circuit; the receiver latch switch, which if open, also breaks the firing circuits; and if the hydraulic pressure falls low, this interrupts the firing circuits by means of positioning the pressure switch in the "open" or inoperative condition.

Assuming all these safety devices to be in the unsafe-tied or operative, firing permitting condition, the pilot presses the firing switch 215 on the control stick whereupon both units fire in exact synchronism, the rockets propel themselves out of the barrels, the position indicating switches 235 and 235' close, the circuit through the "unload" solenoids, is completed to feed more rockets into the firing chambers and the operation described in connection with feeding rockets into the firing chambers is automatically repeated until the new rockets come to rest on the rounds position indicating switch 235 and 235'. If the pilot continues to hold down on the firing switch 215 each time a rocket moves towards the firing chambers, the detent switches are thrown out while the rockets are being pulled in, so that feeding continues automatically, followed by firing.

For the relay switches 240 and 241 to close there must be no rocket in the chambers, so that the current passes through the coils of the shunt circuits from the respective "unloading" solenoids to the coils of the relays 240 and 241. The righthand, or starboard, unit 240 is energized to prevent feeding a rocket into the firing chamber if and when there is no rocket also being fed into or occupying the lefthand, or port, firing chamber and vice versa. That is to say, there must be no rocket in either unit before the other unit will be loaded, because there are two control means actually responsible for bringing a rocket into the chamber, namely, the rounds position indicating switches 235 and 235' and the synchronizing relays 240 and 241 acting to unload one of the magazines. If the starboard gun fires and the port gun does not, having a dud in the chamber, one of the switches 235 and 235' does not open, causing one of the relays 240 or 241 to break the circuit to the "unload" solenoid of the starboard gun, so that no rocket will be loaded into the firing chamber.

During the firing cycle, the detent 42 remains immobile until the rocket leaves the rounds position switch.

To eject a misfire or dud, the master armament switch 214 is closed, passing the energy through the "ready" switch 218, thence through the ejector switch 246, through the wing "full" switch 219; thence through the firing relay 225 which must be in the "up" position and de-energized to enable the ejector to operate; thence through the receiver relay 227; thence through the detent switch 236; through the pressure switch 213, the circuit breaker 212 and so to the positive terminal of the circuit. This enables the opening of the receiver in accordance with the first-described procedure.

The red lights 239 are illuminated whether the wing is up or down, when the detents are in the retracted position and out of engagement with the apertures in the receiver.

The lights 244 and 245 indicate whether there is a rocket in the chamber or not. If the synchronizing relays 240 and 241 are de-energized because of the fact that the rounds switches 235 and 235' are depressed, the indicator lights 244 and 245 are illuminated.

If the pilot finds it necessary to remove a dud from the firing chamber, he merely pushes the eject button 246, leaving all switches, circuits, etc., in the "on" condition. Thereupon, the receiver drops the dud and automatically comes up into position to receive another round for firing. If this eject button or circuit should become disabled, he has the choice of merely switching off the master arming switch, or of moving the "ready" switch to position 218, or performing both operations, the latter of which will complete the circuit to 211.

Each unit, although primarily intended for rocket firing, is in fact capable, if desired, of employment as a bomb-discharger or ejector, bombs being substituted in the magazines for rockets. However, in so utilizing the device, each time a bomb is to be dropped, the eject switch must be operated after the firing chamber has been filled with a bomb, whereafter the chamber is reloaded as in loading it with a rocket. Thereafter, in order to drop the bomb, the eject switch is again operated.

I claim:

1. A piece of ordnance for self-propelling projectiles, comprising: a barrel; cooperative sets of rotative means mutually arranged to define a projectile chamber disposed rearwardly coaxially adjacent said barrel; a projectile magazine disposed laterally adjacent said chamber; one of said sets of means being adapted to be rotated in one direction to receive, rotatively translate and position successive projectiles fed thereto from the exterior to an attitude positioning the projectiles laterally outwardly adjacent said magazine, the other of said cooperative sets being adapted to be rotated in the same direction to cam projectiles successively outwardly of said one of said sets of means into said magazine and the other of said cooperative sets being rotatable in the direction opposite to the first-said direction to remove projectiles successively from said magazine into said projectile chamber; respective means for rotating each of said sets of means in the aforesaid respective directions and halting them in the aforesaid attitudes; projectile firing means disposed operatively adjacent said chamber and adapted to fire projectiles successively disposed, by said sets of means, longitudinally coaxially in said firing chamber; an independent source of energy; and connections between said source and said firing means enabling firing of one projectile at a time from said firing chamber.

2. A piece of ordnance for self-propelling projectiles, comprising: a barrel; cooperative rotative means adapted to define a projectile chamber disposed rearwardly coaxially adjacent said barrel; a projectile magazine disposed laterally adjacent said chamber; one of said rotative means including a plurality of C-shaped, jaw-like projectile receiving, translating and positioning members longitudinally spacedly and rotatably mounted eccentrically of said barrel and adapted for rotation from an attitude for receiving successive projectiles from the exterior to an attitude positioning successive ones of said projectiles laterally adjacent said magazine for stowage therein, the last said attitude also adapting said members for receiving successive projectiles from said magazine for firing; the other of said cooperative means including a plurality of spirally shaped claw-like projectile camming members longitudinally spacedly and rotatably mounted between the first-said members and eccentrically of said barrel and of the first-said members; each of said rotary camming members having a surface adapting it to cam projectiles successively outwardly of said receiving and positioning members into said magazine and having an opposed surface adapted to support the aforesaid positioned projectile and to remove successive ones of said projectiles stowed in said magazine from positions juxtaposed thereto and position them longitudinally coaxially of said barrel for firing; conveyor-means in said magazine for translating projectiles stowed therein successively therefrom toward said camming members; means for rotating the first-said members in a predetermined direction and halting the first-said means in registry with the magazine; means for rotating the second said members in the same direction as the first and until the second-said surface on said camming members cams the projectile positioned in the halted members into said magazine; means for halting the second-said members in a position which with the halted first members completes a firing chamber; projectile firing means disposed operatively adjajcent said chamber and adapted to fire a projectile; an independent source of energy; and connections between said source and said firing means enabling firing of a projectile from said chamber.

3. A piece of ordnance for self-propelling projectiles, comprising: a barrel; cooperative rotative means adapted to define a projectile chamber disposed rearwardly coaxially adjacent said barrel; a projectile magazine disposed laterally adjacent said chamber; one of said rotative means including a plurality of projectile receiving, translating and positioning members longitudinally spacedly and rotatably mounted eccentrically of said barrel and adapted for rotation from an attitude for receiving successive projectiles from the exterior to an attitude positioning successive ones of said projectiles laterally adjacent said magazine for stowage therein, the last-said attitude adapting said members for receiving successive projectiles from said magazine for firing; the other of said cooperative means including projectile camming members longitudinally spacedly and rotatably mounted between the first-said members and eccentrically of said barrel and of the first said members; each of said rotary camming members having a surface adapting it to cam projectiles successively outwardly of said receiving and positioning members into said magazine and having an opposed surface adapted to support the aforesaid projectile and to remove successive ones of said projectiles stowed in said magazine from positions juxtaposed thereto and position them longitudinally coaxially of said barrel for firing; conveyor means in said magazine for translating projectiles stowed therein successively therefrom toward said camming members; hydraulically actuatable piston and cylinder means having the piston rod pivotally connected to one of the first-said members with the piston rod directed secantwise thereof, the piston and rod being adapted to be actuated to rotate the first-said members in unison in a predetermined direction and to halt same in registry with the magazine; hydraulically driven cyclically actuated prime-mover means connected to the second-said members for rotating same in unison and in the same direction as the first-said members until the second-said surface on said camming members cams the projectile positioned in the halted members into said magazine; means for halting the second-said members in a position which with the halted first-said members completes a firing chamber; projectile firing means disposed operatively adjacent said chamber and adapted to fire a projectile; an independent source of energy; and connections between said source and said firing means enabling firing of a projectile in said chamber.

4. A rocket machine gun installation for an airplane having port and starboard wings comprising: a piece of ordnance as defined in claim 2 mounted in the port wing with said barrel and chamber extending chordwise and said magazine extending spanwise outwardly towards the port wing tip; a similar piece of ordnance mounted in the starboard wing with the barrel and chamber extending chordwise and the magazine extending spanwise outwardly therefrom toward the starboard wing tip; an electrical control system for controlling the phases of rotation of the two sets of rotatable members operatively connected to the means for rotating said sets of members; and synchronizing means operatively interposed in said control system.

5. In a device according to claim 4, hydraulic pressure operated switch means operatively interposed in said electrical system and adapted to open and thereby break the circuits of said electrical system when said hydraulic pressure drops to zero, thereby to prevent said circuits from being damaged by overload.

6. In a device according to claim 4, automatic means operatively interposed in the actuating means of each of the pieces of ordnance and automatically effective to render the one of said pieces of ordnance inactive when the other of said pieces of ordnance becomes inactive, thereby to render it impossible to discharge all the projectiles from the magazine associated with the first-said piece of ordnance when the magazine associated with the second-said piece of ordnance contains projectiles, whereby unbalance of the airplane about its longitudinal axis is obviated.

7. A device according to claim 4, in which the electrical control system for controlling the phases of rotation of the two sets of rotatable members comprises an electrical D. C. energy source; a firing contact disposed in said chamber adjacent the firing band of the self-propelling projectile; a conductor path connecting said contact and said source; a firing relay operatively interposed in said path; means for operating said firing relay to energize said firing contact; and electrical means responsive to the firing position and locked condition of said projectile receiving members and said projectile camming members and to the presence of a round in said firing chamber, interposed operatively in said conductor path between said firing relay and said source and adapted to cooperate with said firing relay to enable firing a round when same is predeterminedly positioned in the predeterminedly positioned and conditioned firing chamber.

8. In a device according to claim 3, means for controlling the direction of rotation of said prime-mover in order to control the directions of rotation of said camming members, said prime-mover having a pressure fluid inlet and an outlet, comprising: a valve-within-a-valve interposed in the pressure fluid path between the source of the pressure fluid and said prime-mover, the inner valve comprising a headed rod having an annular groove near the one end thereof longitudinally spaced from a similar groove near the other end thereof and the outer valve comprising a sleeve slidably mounted on said rod and having a pair of annular ports at each end adapted to alternately register with the adjacent groove in said inner valve to enable flow through said valve-within-a-valve respectively to said inlet and to said outlet; and means coordinated with the phases of operation of said ordnance device for applying fluid pressure alternately to said head and to the opposite end of said outer valve so as to shift said inner and outer valves relatively to each other in those two directions which cause reversal of flow of said pressure fluid to the inlet of said prime-mover.

9. A device according to claim 8, in which said means coordinated with the phases of operation of said ordnance device for applying said fluid pressure as described comprises a housing having a fluid connection to said head and a fluid connection to said outer valve and having a fluid circuit connection to said ejector; a pair of substantially parallel bores in said housing, each bore containing a double headed piston reciprocatable therein; means supplying pressure fluid to said housing between said bores; surfaces defining a passageway connecting said bores medially of their length; other surfaces defining a passageway connecting said bores at the one end thereof; and still other surfaces defining a passageway connecting said bores at the opposite end thereof; and single-acting electromagnetic means operatively connected to each of the ends of said double-headed pistons and adapted to respond to directed electrical impulses to alternately direct said pressure fluid as aforesaid to said valve-within-a-valve and to said ejector.

10. In an ordnance device in which there is a projectile receiver constituted in part by a plurality of C-jaws rotatable together about the longitudinal axis of the device by means of a hydraulic piston and cylinder ejector-device operatively connected thereto and having a de-actuating detent actuated by a pressure fluid controlled by a solenoid operated pilot-valve: an electrical system for actuating the aforestated means, comprising: a source of electrical energy; a grounded solenoid operatively connected to the pilot-valve in the pressure fluid line connected actuatingly to said piston and cylinder device, and a conductor path extending from said source to said grounded solenoid, said conductor path including a detent switch in series with said source and the ground, a grounded receiver relay in series with said detent switch; a wing switch in series with said receiver relay; a magazine unload switch in series with said wing-switch; a receiver close switch in shunt with said receiver relay; and a conductor path connecting said solenoid with said receiver close switch to actuate the solenoid and operate the pilot valve in that direction which actuates said piston to rotate the receiver into an "open" position, said conductor path extending from said solenoid to said receiver relay switch and thence to said source.

11. An ordnance piece for self-propelled projectiles comprising: a barrel; plural sets of rotating means alternately arranged to define a projectile chamber coaxial with and rearward of said barrel; a magazine feeding into said chamber and extending laterally thereof; a casing housing said barrel, said rotating means and said chamber, said casing having an opening in its lower surface through which projectiles may pass; one of said sets of rotating means comprising C-shaped members, the opening in the C being adapted to align with the magazine or the opening in the casing; the other of said sets comprising claw-like grasping and camming members which, when the openings in the C members are aligned with the magazine, rotate in one direction to segregate one projectile from the magazine and position it in the chamber for launching, said claw like members when rotating in the other direction serving to cam a projectile out of the chamber.

12. An ordnance piece for self-propelled projectiles comprising: a barrel; means defining a projectile chamber coaxial with and immediately aft of the barrel; a magazine extending laterally of and communicating with the chamber; a wing-like casing housing said barrel, said chamber and said magazine, said casing having a lower opening communicating with the chamber; the said means defining a projectile chamber including one set of rotating member for moving projectiles from a position where said projectiles may pass through the opening in the casing to a position where said projectiles may pass between the chamber and the magazine, said means including a second set of members serving to move projectiles away from the first said set into the magazine and also serving to move projectiles from the magazine into the first said set of rotating means whereby said projectile chamber defining means serve to load the magazine and position projectiles to be launched through the barrel or dropped through the lower opening.

13. An ordnance piece for self-propelled projectiles comprising: a magazine; a launching chamber in communication with the magazine, said launching chamber including a first set of members having openings receiving projectiles from the magazine when in registry therewith and being rotatable to a position out of registry with the magazine; a second set of movable members mounted in said chamber and having projectile engaging surfaces to positively move projectiles out of said chamber into said magazine to effect loading thereof.

References Cited in the file of this patent
UNITED STATES PATENTS

| | | |
|---|---|---|
| 2,440,634 | Henney | Apr. 27, 1948 |
| 2,440,723 | MacDonald | May 4, 1948 |
| 2,451,522 | Uhl et al. | Oct. 19, 1948 |
| 2,464,920 | Carter | Mar. 22, 1949 |
| 2,485,715 | Eastman | Oct. 25, 1949 |
| 2,546,823 | Holloway | Mar. 27, 1951 |
| 2,598,001 | Kunz | May 27, 1952 |
| 2,599,555 | Hurt | June 10, 1952 |